(12) United States Patent
Tseng

(10) Patent No.: US 6,247,374 B1
(45) Date of Patent: Jun. 19, 2001

(54) LOCKING MECHANISM FOR AUTOMATICALLY IMMOBILIZING A CARRIAGE OF A SCANNER AT A REST POSITION

(75) Inventor: Jacky Tseng, Hsinchu (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/311,006

(22) Filed: May 13, 1999

(51) Int. Cl.[7] ..................................................... G02B 26/08

(52) U.S. Cl. ........................ 74/89.22; 359/896; 359/196

(58) Field of Search ........................... 74/89, 89.22, 89.2, 74/490.09; 292/58, 59, 341.16; 359/819, 820, 821, 822, 823, 824, 825, 826, 827, 828, 829, 830, 811, 896; 192/139; 369/263; 358/498, 296, 474, 496; 400/110

(56) References Cited

U.S. PATENT DOCUMENTS

| | | | | |
|---|---|---|---|---|
| 5,444,690 | * | 8/1995 | Childers, III et al. | 369/263 |
| 5,760,926 | * | 6/1998 | Howard et al. | 358/498 |
| 5,767,977 | * | 6/1998 | Thelen et al. | 358/296 |
| 5,791,792 | * | 8/1998 | Johnson et al. | 400/110 |
| 5,907,413 | * | 5/1999 | Han | 358/474 X |
| 5,973,866 | * | 10/1999 | Tseng | 359/896 |
| 6,043,908 | * | 3/2000 | Takeuchi | 358/496 |

* cited by examiner

Primary Examiner—David A. Bucci
Assistant Examiner—Colby Hansen
(74) Attorney, Agent, or Firm—William J. Sapone; Coleman Sudol Sapone, P.C.

(57) ABSTRACT

A locking mechanism for fixing a carriage at a specific position automatically is provided. This locking mechanism includes a fixing device and a transmitting device. The fixing device is used for securing the carriage at the specific position, and the transmitting device is used for driving the carriage to be secured to the fixing device in a first instance and detaching the carriage from the fixing device in a second instance.

32 Claims, 4 Drawing Sheets

LOCKING MECHANISM FOR AUTOMATICALLY IMMOBILIZING A CARRIAGE OF A SCANNER AT A REST POSITION

FIELD OF THE INVENTION

The present invention relates to a locking mechanism for fixing a carriage automatically, and especially to a locking mechanism for fixing a scanning module of a flatbed scanner automatically when the scanning module is returned to a specific position.

BACKGROUND OF THE INVENTION

Among the various kinds of flatbed scanners on the market, most of them have locking mechanisms, no matter whether the scanning modules are in the kinds of the charge-coupled devices (CCD) or contact image sensor (CIS). For the current technique, all locking mechanisms are manually controlled. In other words, when the scanning module of a scanner is returned to a specific position, usually the threshold position, the user has to manually control the locking mechanism to fix the scanning module.

In addition, there is no sensor detecting whether the scanning module is properly fixed or not. If the scanning module is not properly fixed and someone moves or shakes the scanner inadvertently, the transmitting device and the scanning module of the scanner will be damaged and the accurate position of the mirror sets will be shifted.

If there is a locking mechanism that can fix the scanning module automatically, the damage resulting from an improper operation can be prevented. It is therefore attempted by the applicant to deal with the above situation encountered with the prior art.

SUMMARY OF THEE INVENTION

An object of the present invention is to provide a locking mechanism for fixing a carriage at a specific position automatically. The locking mechanism is adapted to be used in a scanner, preferably a flatbed scanner. The locking mechanism includes a fixing device for securing the carriage at the specific position, and a transmitting device for driving the carriage to be secured to the fixing device in a first instance and detaching the carriage from the fixing device in a second instance.

According to the present invention, the carriage is a scanning module, preferably a charged-coupled device (CCD) or a contact image sensor (CIS). The specific position is the threshold position of the carriage, and the carriage has a rib at one end thereof.

The transmitting device of the present invention includes a driving device, a rotatable gear wheel driven by the driving device, a first belt mounted between the carriage and the gear wheel for driving the carriage to move in response to the rotation of the gear wheel, and a second belt mounted between the gear wheel and the fixing device for driving the fixing device to fix the carriage in response to the rotation of the gear wheel. The carriage is moved toward the fixing device when the driving device is actuated in a direction in the first instance and is moved away from the fixing device when the driving device is actuated in the other direction in the second instance.

In accordance with the present invention, the driving device is a motor having a driving pinion, and the gear wheel has a plurality of teeth for engaging with the driving pinion of the motor. In addition, the gear wheel includes an upper portion for being surrounded by the second belt and a lower portion for being surrounded by the first belt. The upper portion of the gear wheel has a diameter smaller than that of the lower portion.

The fixing device of the present invention includes a rotatable cam and a locking member. The cam is connected to the gear wheel through the second belt and driven by the second belt. The locking member is adjacent to the cam for preventing relative rotation of the cam and securing the carriage therein.

According to the present invention, the fixing device further includes a base for securing the locking member and the cam thereon. The locking member includes a detachable upper portion with a helical ramp at its lower end and a lower portion with a helical ramp at its upper end corresponding to that of the upper portion. The upper portion of the locking member has a first recess for engaging with a rib of the cam to prevent relative rotation of the cam, and has a second recess for engaging a rib of the carriage to secure the carriage therein.

In accordance with the present invention, the upper portion of the locking member is rotated longitudinally upwardly at a specific angle, preferably 90 degrees, for engaging the second recess of the locking member with the rib of the carriage when the rib of the carriage is moved toward and biases against the upper portion of the locking member in the first instance. The upper portion of the locking member is rotated longitudinally downwardly for detaching the rib of the carriage from the second recess of the locking member when the driving device is actuated in the other direction in the second instance.

The present invention may best be understood through the following description with reference to the accompanying drawings, in which:

DETAILED DESCRIPTION OF THE PREFERRED EMBODIMENTS

Figure 1:
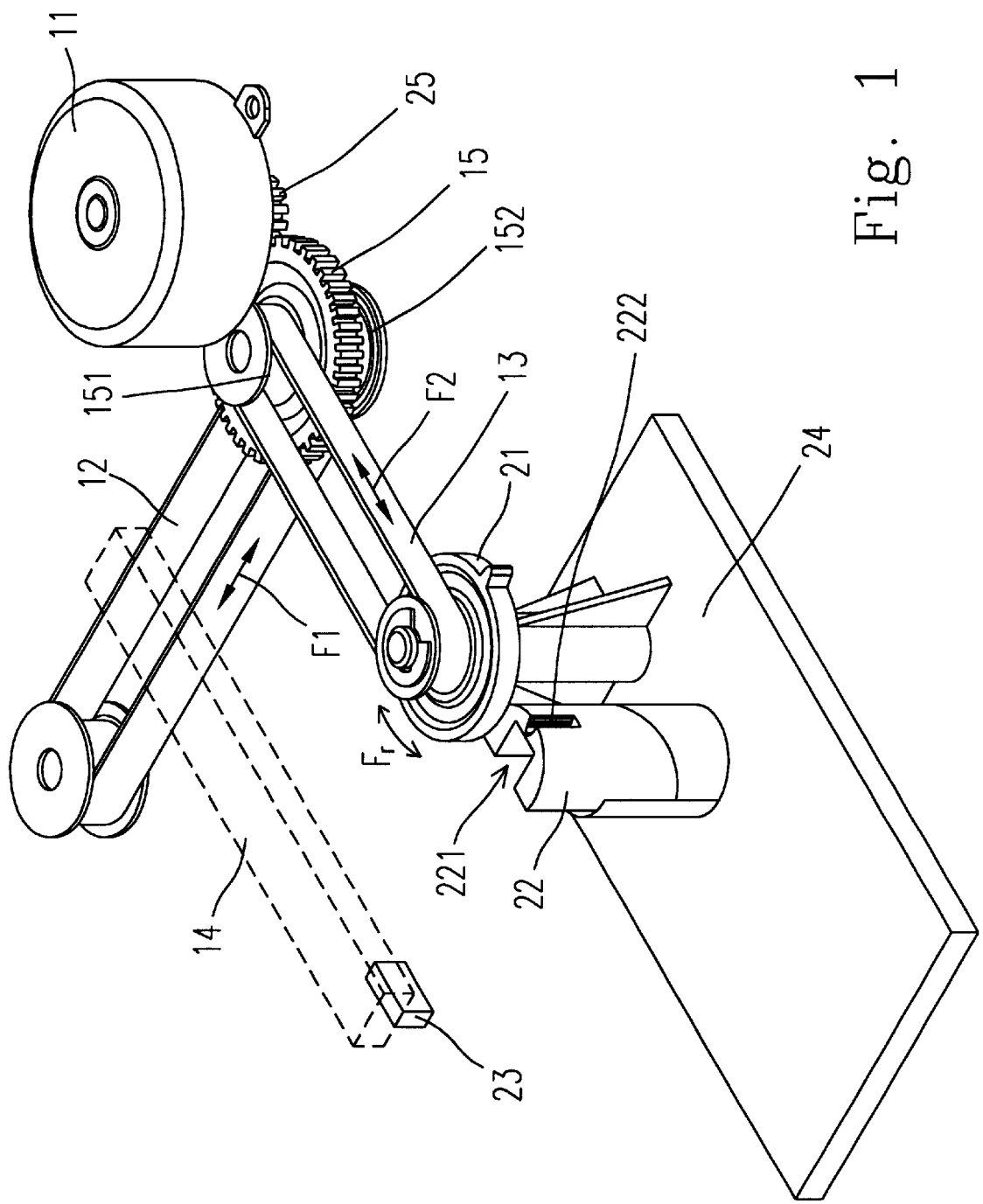
FIG. 1 schematically shows the locking mechanism in a scanner according to the present invention.

As shown in FIG. 1, the locking mechanism is used for fixing a carriage 14 at a specific position automatically and is adapted to be used in a scanner. This specific position is usually the threshold position or the original position of the carriage. In other words, this specific position is the place where the carriage is preset in the factory. The scanner is preferably a flatbed scanner and the carriage 14 preferably includes a scanning module, such as a charge-coupled device (CCD) and a contact image sensor (CIS).

The locking mechanism includes a fixing device and a transmitting device. The fixing device is used for securing the carriage 14 at the specific position, and the transmitting device is used for driving the carriage 14 to be secured to the fixing device in a first instance and allowing the carriage 14 to be detached from the fixing device in a second instance.

The transmitting device includes a driving device 11, a rotatable gear wheel 15 driven by the driving device 11, a first belt 12, and a second belt 13. The first belt 12 is mounted between the carriage 14 and the gear wheel 15 for driving the carriage 14 to move in response to the rotation of the gear wheel 15. The second belt 13 is mounted between the gear wheel 15 and the fixing device for driving the fixing device to fix the carriage 14 in response to the rotation of the gear wheel. The carriage 14 is moved toward the fixing device when the driving device 11 is actuated in a direction in the first instance and is moved away from the fixing device when the driving device is actuated in the other direction in the second instance.

The driving device 11 of the present invention is preferably a motor 11 having a driving pinion 25 and there are a plurality of teeth on the gear wheel 15 for engaging with the driving pinion 25 of the motor 11. The gear wheel 15 includes an upper portion 151 for being surrounded by the second belt 13 and a lower portion 152 for being surrounded by the first belt 12. The diameter of the upper portion 151 is smaller than that of the lower portion 152.

Figure 2:
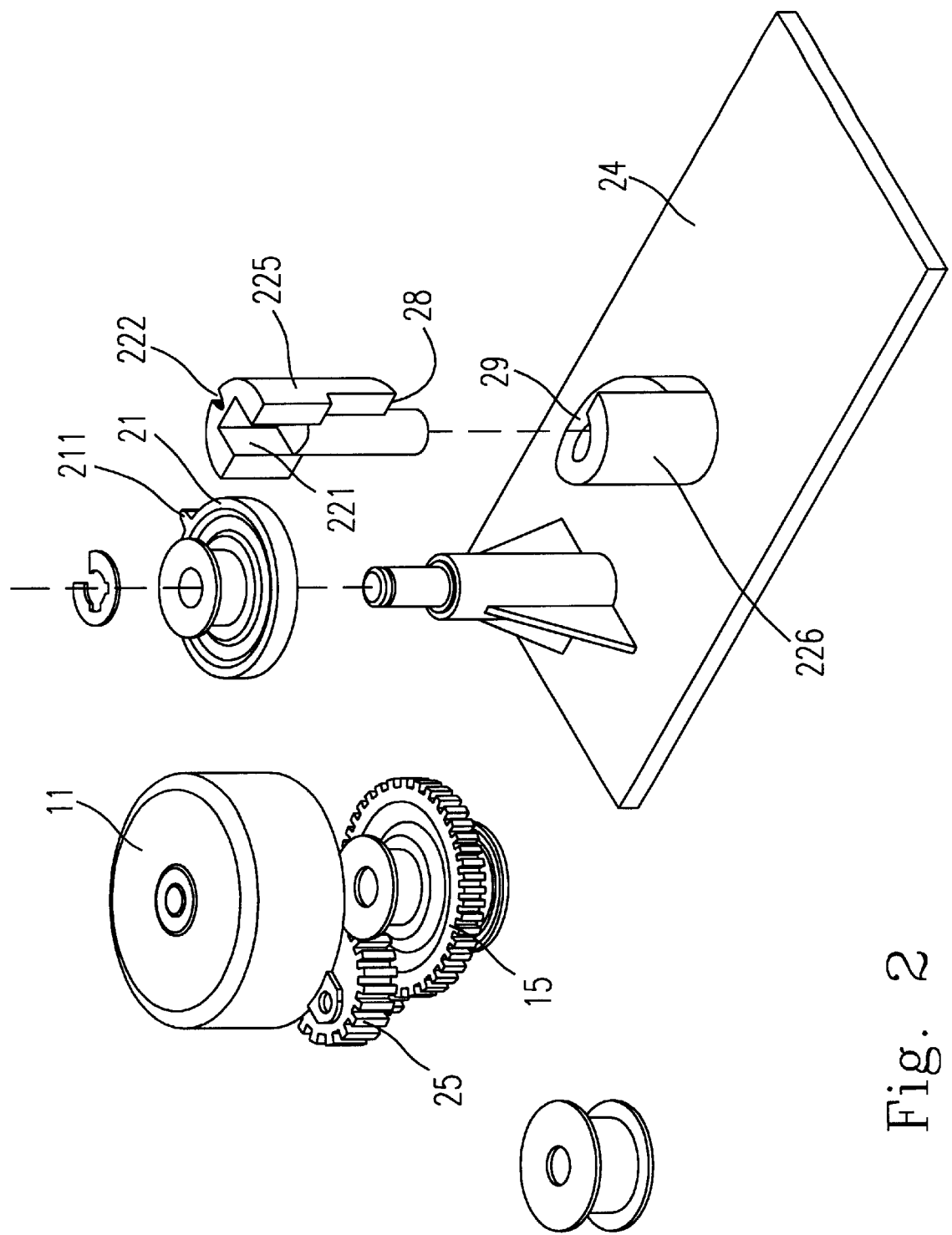
FIG. 2 schematically shows the fixing device according to the present invention.

FIG. 2 schematically shows the fixing device in detail according to the present invention. The fixing device includes a rotatable cam 21 and a locking member 22. The cam 21 is connected to the gear wheel 15 through the second belt 13 and driven by the second belt 13 in response to the rotation of the gear wheel 15. The locking member is adjacent to the cam 21 for preventing the relative rotation of the cam 21 and securing the carriage therein.

According to the present invention, the locking mechanism further includes a base 24 for securing the locking member 22 and the cam 21 thereon. The locking member includes a detachable upper portion 225 with a helical ramp 28 at its lower end, and a lower portion 226 with a helical ramp 29 at its upper end corresponding to the helical ramp 28 of the upper portion 225. As shown in FIG. 2, there are a first recess 222 and a second recess 221. The first recess 222 is used for engaging with a rib 211 of the cam 21 to prevent the relative rotation of the cam 21. The second recess 221 is used for engaging with a rib 23 of the carriage 14 to secure the carriage therein.

Figure 3:
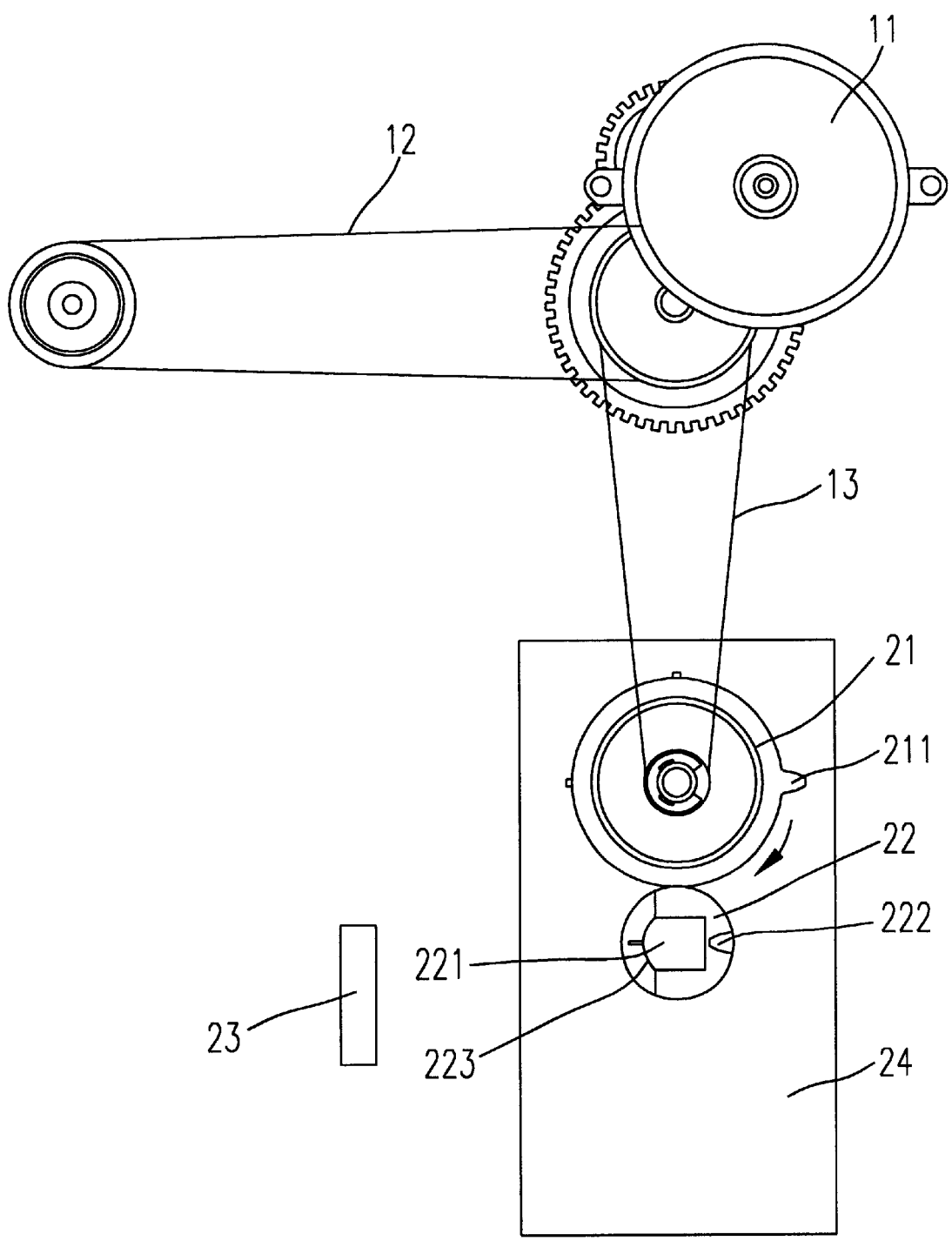
FIG. 3 is a top view showing the locking mechanism when the carriage is in motion.
Figure 4:
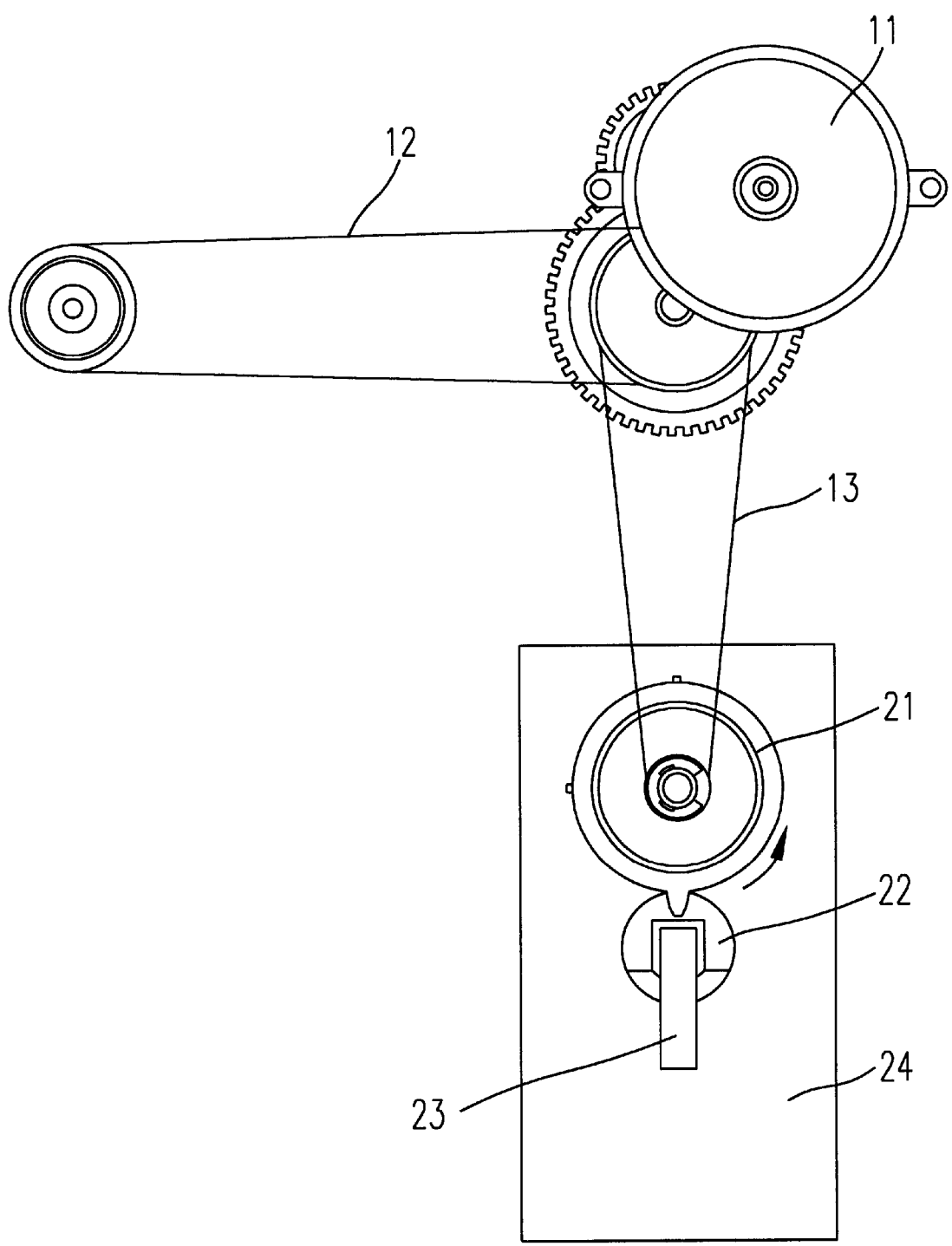
FIG. 4 is a top view showing the locking mechanism when the carriage is fixed at the specific position.

Please refer to FIG. 3. The motor 11 is actuated in a direction, such as a clockwise direction, to move the carriage 14 toward the threshold position when the scanner is not in use. When the rib 211 of the carriage 14 biases against the rim 223 of the second recess 221, the upper portion 225 of the locking member 22 is rotated longitudinally upwardly at a specific angle for enabling the second recess 221 to engage with the rib 23. In this situation, the upper portion 225 is rotated by 90 degrees counterclockwise. In addition, because the upper portion 225 is rotated longitudinally upwardly, the first recess 222 and the rib 211 of the cam 21 are positioned at the same height. Therefore, the rib 211 of the cam 21 will be engaged in the first recess 222 and the carriage 14 will be fixed automatically, as shown in FIG. 4.

On the contrary, when the scanner is in use, the motor 11 is actuated in another direction, such as a counterclockwise direction, to move the carriage 14 away from the threshold position. Therefore, the rib 23 will not bias against the rim 223 of the second recess 221 and the upper portion 225 of the locking member 22 will be rotated longitudinally downwardly. At the very moment, the rib 23 of the carriage 14 is disengaged from the second recess 221, and the rib 211 of the cam is disengaged from the first recess 222. Further, because the locking member 22 is rotated downwardly, the cam 21 can be rotated freely.

Therefore, the locking mechanism of the present application can effectively prevent the damage caused by an improper operation. When the carriage is returned to the threshold position, no matter whether the scanner is turned on or off, the carriage can be fixed automatically. The automatically controlled locking mechanism is very convenient.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transmitting and locking mechanism for transmitting a carriage, and for fixing said carriage at a specific position automatically, adapted to be used in a scanner, comprising:
   a fixing device located at said specific position for securing said carriage; and
   a transmitting device connected to said fixing device and said carriage, driving said carriage to be secured to said fixing device in a first instance, and detaching said carriage from said fixing device in a second instance, said transmitting device including:
   a driving device;
   a rotatable gear wheel driven by said driving device;
   a first belt mounted between said carriage and said gear wheel for driving said carriage to move in response to the rotation of said gear wheel; and
   a second belt mounted between said gear wheel and said fixing device for driving said fixing device to secure said carriage in response to the rotation of said gear wheel.

2. The transmitting and locking mechanism according to claim 1, wherein said carriage is a scanning module.

3. The transmitting and locking mechanism according to claim 2, wherein said scanning module is a charged-coupled device (CCD).

4. The transmitting and locking mechanism according to claim 2, wherein said scanning module is a contact image sensor (CIS).

5. The transmitting and locking mechanism according to claim 1, wherein said carriage has a rib at one end thereof.

6. The transmitting and locking mechanism according to claim 1, wherein said carriage is moved toward said fixing device when said driving device is actuated in a direction in said first instance and is moved away from said fixing device when said driving device is actuated in the other direction in said second instance.

7. The transmitting and locking mechanism according to claim 1, wherein said driving device is a motor having a driving pinion.

8. The transmitting and locking mechanism according to claim 7, wherein said gear wheel has a plurality of teeth for engaging with said driving pinion of said motor.

9. The transmitting and locking mechanism according to claim 1, wherein said gear wheel includes an upper portion for being surrounded by said second belt and a lower portion for being surrounded by said first belt.

10. The transmitting and locking mechanism according to claim 9, wherein said upper portion of said gear wheel has a diameter smaller than that of said lower portion.

11. The transmitting and locking mechanism according to claim 1, wherein said fixing device includes:
    a rotatable cam connected to said gear wheel through said second belt and driven by said second belt in response to the rotation of said gear wheel; and a locking member adjacent to said cam for preventing relative rotation of said cam and securing said carriage therein.

12. The transmitting and locking mechanism according to claim 11, wherein said fixing device further includes a base connected to said locking member and said cam for securing said locking member and said cam thereon.

13. The transmitting and locking mechanism according to claim 11, wherein said cam has a radially outwardly extending rib for engaging with a recess of said locking member to prevent said relative rotation of said locking member.

14. The transmitting and locking mechanism according to claim 11, wherein said locking member includes a detachable upper portion with a helical ramp at its lower end and a lower portion with a helical ramp at its upper end corresponding to that of said upper portion.

15. The transmitting and locking mechanism according to claim 14, wherein said upper portion of said locking member has a first recess for engaging with a rib of said cam to prevent relative rotation of said cam.

16. The transmitting and locking mechanism according to claim 14, wherein said upper portion of said locking member has a second recess for engaging a rib of said carriage to secure said carriage therein.

17. The transmitting and locking mechanism according to claim 16, wherein said upper portion of said locking member is rotated longitudinally upwardly at a specific angle for enabling said second recess of said locking member to engage with said rib of said carriage when said rib of said carriage is moved toward and biases against said upper portion of said locking member in said first instance.

18. The transmitting and locking mechanism according to claim 17, wherein said upper portion of said locking member is rotated longitudinally downwardly for enabling said rib of said carriage to detach from said second recess of said locking member when said driving device is actuated in the other direction in said second instance.

19. A locking mechanism of a scanner for fixing a carriage at a specific position automatically, comprising:
- a driving device for providing a driving force,
- a first engaging member mounted on said carriage and moving with said carriage toward said specific position in response to said driving force;
- a second engaging member located at said specific position, and rotating around a shaft in response to said driving force;
- a third engaging member located adjacent to said second engaging member, and including a first part and a second part;
- wherein said third engaging member is rotated by said first engaging member at said specific position to adjust positions of said first and second parts until said first and second parts engage with said first and second engaging members, respectively, to immobilize said carriage at said specific position.

20. The locking mechanism according to claim 19 wherein said driving device is a motor.

21. The locking mechanism according to claim 20 wherein said driving force is transmitted to said first engagement via a driving pinion connected to said motor, a rotatable gear wheel engaging with said driving pinion, a first belt surrounding an upper portion of said rotatable gear wheel.

22. The locking mechanism according to claim 21 wherein said driving force is transmitted to said second engaging member via said driving pinion, said rotatable gear wheel, and a second belt surrounding a lower portion of said rotatable gear wheel.

23. The locking mechanism according to claim 19 wherein said first engaging member is a rib arranged at one end of said carriage.

24. The locking mechanism according to claim 23 wherein said first part of said third engaging member is a recess for receiving said rib of said carriage therein so as to immobilize said carriage at said specific position.

25. The locking mechanism according to claim 19 wherein said second engaging member is a rib radially outwardly extending from a rotatable cam.

26. The locking mechanism according to claim 25 wherein said second part of said third engaging member is a recess for receiving said rib of said cam therein so as to stop said third engaging member from being further rotated by said first engaging member.

27. The locking mechanism according to claim 19 wherein said third engaging member consists of an upper portion with a helical ramp at its lower end, and a lower portion with a helical ramp at its upper end corresponding to that of said upper portion, and said upper portion is rotatable relative to said lower portion to ascend in a first instance and descend in a second instance so as to adjust said positions of said first and second parts.

28. A locking mechanism of a scanner for fixing a carriage at a specific position automatically, comprising:
- a first rib mounted on said carriage and transmitted toward said specific position along with said carriage; and
- a locking member rotatably located at said specific position, having a first recess thereon, and pushed to rotate by said first rib to align and engage said first recess with said first rib of said carriage, thereby fixing said carriage at said specific position.

29. The locking mechanism according to claim 28 further comprising a rotatable cam, located adjacent to said locking member, having thereon a second rib, and rotating to align and engage said second rib with a second recess of said locking member at the time that said first rib engages with said first recess in order to further assure of the immobilization of said carriage at said specific position.

30. The locking mechanism according to claim 29 wherein said rotatable cam and said first rib are driven by a single motor so as to control the simultaneous engagement of said first and second ribs with said first and second recesses, respectively.

31. The locking mechanism according to claim 30 wherein said rotatable cam and said first rib are driven by said single motor via a common driving pinion, respective co-axial gear wheels, and respective transmitting belts.

32. The locking mechanism according to claim 30 wherein said locking member consists of an upper portion with a helical ramp at its lower end, and a lower portion with a helical ramp at its upper end corresponding to that of said upper portion, and said upper portion is rotated by said first rib to ascend to have said second recess engage with said second rib for locking, and descend to have said second recess disengage with said second rib for unlocking.

* * * * *